United States Patent [19]
Lejeune

[11] 3,890,008
[45] June 17, 1975

[54] WHEEL RIM WITH TROUGH ACCOMMODATING BALANCING WEIGHT

[75] Inventor: Daniel Lejeune, Clermont-Ferrand, France

[73] Assignee: Compagnie Generale des Establissements Michelin, raison sociale Michelin & Cie., Clermont-Ferrand (Puy-de-Dome), France

[22] Filed: June 17, 1974

[21] Appl. No.: 480,246

[30] Foreign Application Priority Data
June 20, 1973 France .............................. 73.22599

[52] U.S. Cl. .............................. 301/5 B; 301/63 R
[51] Int. Cl. ............................................. B60b 13/00
[58] Field of Search .................. 301/5 R, 5 B, 63 R

[56] References Cited
UNITED STATES PATENTS

| | | |
|---|---|---|
| 3,017,224 | 1/1962 | Palmer .............................. 301/5 B |
| 3,799,618 | 3/1974 | Martinoli .............................. 301/5 B |

*Primary Examiner*—M. Henson Wood, Jr.
*Assistant Examiner*—D. W. Keen
*Attorney, Agent, or Firm*—Brumbaugh, Graves, Donohue & Raymond

[57] ABSTRACT

At least one edge of a wheel rim is widened axially and is formed on its radially outer periphery with a groove in a portion located beyond the zone of contact with the tire bead and on its axially outer periphery with a circumferential trough. The trough accommodates a balancing weight so that the weight does not extend axially beyond the edge of the rim. The groove provides anchorage for the radially outer end of the fastening clip that secures the weight. The function of the edge of the rim with respect to the bead of the tire is thus entirely dissociated from the function of the edge of the rim with respect to the balancing weight.

4 Claims, 1 Drawing Figure

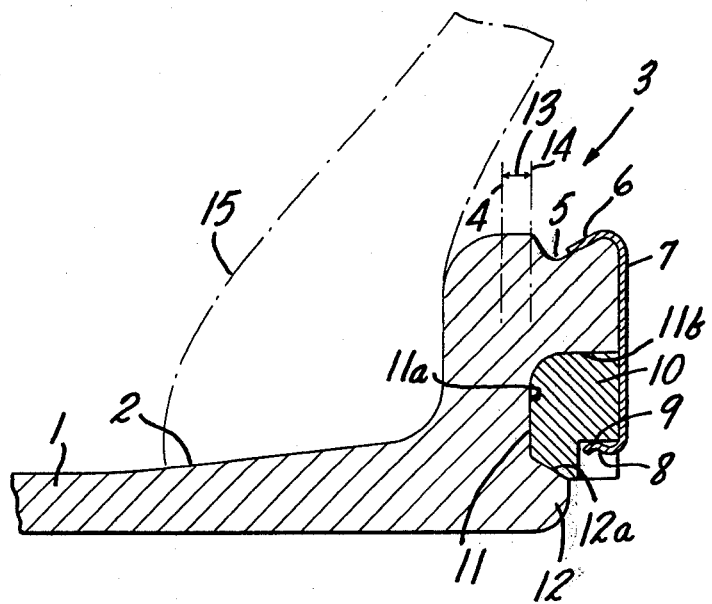

WHEEL RIM WITH TROUGH ACCOMMODATING BALANCING WEIGHT

BACKGROUND OF THE INVENTION

This invention relates to wheels for automotive vehicles and, more particularly, to wheels having novel and highly-effective rims and intended for the mounting of pneumatic tires.

Despite relatively narrow manufacturing tolerances for tires and wheels for automotive vehicles, it happens that the tire/wheel assembly or unit may cause disturbances in the steering of the vehicles. These disturbances may be due, in whole or in part, to an imbalance of the rotating tire/wheel unit. In order to overcome this imbalance, balancing weights are customarily attached to the wheel rims.

The fastening of the weights onto the edges of the rim is conventionally effected by means of elastic clips or clamps made of steel. These clips have two hooks. One presses against the weight, while the other extends around the curved end of the edge of the rim. This way of fastening the weights leaves much to be desired in a number of respects.

Since the profile of the edge of the rim takes the tires and rim standardization into account, it is necessary to dimension the weights as a function of this profile, without, however, using weights that are too thick. When the weight, or even its fastener, protrudes axially beyond the profile of the bead of the rim, there is a danger of its being pulled out by contact with an obstacle (a curbstone, for example), particularly in the case of a rim having an edge of substantial thickness.

Furthermore, the fastener must be both elastic in order to facilitate the placing thereof and strong or stiff in order to avoid the loss of the weight and a sudden imbalance during use. Conventional fasteners are therefore often thick, so that they rub against the walls of the tires and leave permanent imprints there.

SUMMARY OF THE INVENTION

An object of the present invention is to overcome these drawbacks, which are due in large part to the profiles imposed on the rim edges. In accordance with the invention, the function of the rim edge having to do with the mounting of the tire is dissociated from the function having to do with the fastening of the balancing weights.

The wheel rim in accordance with the invention is provided with a rim base extended axially on each side by a seat for the respective tire beads and thereafter by a rim edge and is characterized in that at least one of the rim edges is widened axially and provided on its radially outer periphery, within a portion located axially beyond the zone of contact with the tire bead, with a groove intended to serve as an anchorage for the radially outer hook of the fastener.

The rim edge in accordance with the invention is provided in its axially outer and radially inner portion with a circumferential trough intended to house the weight or weights in such a manner that the weights do not protrude axially beyond the contour of the rim edge. It is also advantageous to use a rim edge of sufficient size to provide radially inwardly of the circumferential trough a rib protruding axially towards the outside. The purpose of this rib is to effect a wedging of the weight or weights in the outward radial direction, which facilitates the securing of the weights. At the same time, the rib constitutes a very effective reinforcement in a region of the rim which is subjected to severe stresses in operation.

BRIEF DESCRIPTION OF THE DRAWING

A better understanding of the invention may be gained from the following detailed description of a preferred embodiment of the invention in conjunction with the appended drawing, in which the sole FIGURE is a fragmentary view in radial section of a preferred embodiment of a wheel rim in accordance with the invention.

DESCRIPTION OF THE PREFERRED EMBODIMENT

The drawing shows in radial or axial section the portion of a rim base 1 adjacent a bead seat 2. The seat 2 for the tire bead is extended by a thickened rim edge 3. Normally, contact with the bead 15 of the tire extends axially as far as the position indicated by a straight line 4 perpendicular to the axis of rotation of the wheel. Axially beyond the limit line 4 and on the outer periphery of the rim edge (which, as can be seen, is thickened in the axial direction), a circumferential groove 5 is provided. The radially outer hook 6 of a fastener 7 rests in the groove 5. The radially inner hook 8 of the fastener 7 rests on a radially inner face 9 of the weight 10.

The weight 10 is housed in a circumferential trough 11 formed with an axially inner, substantially radial wall 11a and a radially outer wall 11b substantially parallel to the axis of the rim. The axial depth of the trough is such that the weight 10 does not protrude axially beyond the axially outer contour of the rim edge 3. Moreover, a circumferential rib 12 radially inward of the weight effects a wedging of the weight 10 in a radially outer direction, by virtue of a wall 12a, which is also a wall of the trough 11, and which extends from the radially inner end of the wall 11a inward and outward with respect to the radial and axial directions, respectively.

The function of the edge of the rim with respect to the bead of the tire is entirely dissociated from the function of the edge of the rim with respect to the balancing weight. By increasing the axial width of the rim edge, that is to say, the distance 13 (which in the extreme may be zero) between the contact limit line 4 (as defined above) of the tire bead and the axially inner limit line 14 of the groove 5 for the attachment of the fastener 7 in accordance with the invention, the two functions are dissociated as desired. This furthermore makes it possible to increase the strength of the rim edge, which is not possible with conventional arrangements without having recourse to the use of specially designed weights.

A rim edge in accordance with the invention can, on the other hand, accommodate itself to weights and fasteners of various types.

The invention applies to any kind of rim, whatever its type, its method of manufacture, or the base material or materials which serve for its production. Those skilled in the art will understand that the invention includes embodiments in addition to the representative one disclosed above and is as broad as the appended claims and their equivalents.

I claim:

1. A wheel rim for mounting a pneumatic tire formed with tire beads and comprising a rim base extended on opposite sides by a bead seat and by a rim edge, at least one of the rim edges being intended to be equipped with a balancing weight secured by a fastener, characterized in that at least said one rim edge is widened axially and is formed on its radially outer periphery with a groove in a portion located beyond the zone of contact with the tire bead and on its axially outer periphery with a circumferential trough, the trough accommodating the weight and the groove providing anchorage for the radially outer end of the fastener.

2. A wheel rim according to claim 1 wherein the trough is formed at its axially inner end with a substantially radial wall and at its radially outer end with a wall substantially parallel to the axis of the rim.

3. A wheel rim according to claim 1 wherein the trough has an axial depth at least equal to the axial thickness of the weight.

4. A wheel rim according to claim 2 further comprising a circumferential rib radially inward of the weight and having an axial width which is at most equal to the axial depth of the trough, the trough being formed with a third wall, the third wall being a surface of the circumferential rib and extending from the radially inner end of the substantially radial wall in a direction which is inward and outward with respect to the radial and axial directions, respectively.

* * * * *